Aug. 20, 1963    G. SCHLOTTERER    3,101,401
METHOD FOR THE MANUFACTURE OF HOLLOW BODIES
Filed July 23, 1958

INVENTOR.
GUSTAV SCHLOTTERER
BY
Leon M. Strauss
AGT.

United States Patent Office 3,101,401
Patented Aug. 20, 1963

3,101,401
METHOD FOR THE MANUFACTURE OF
HOLLOW BODIES
Gustav Schlotterer, 11 Sybelstrasse, Dusseldorf, Germany
Filed July 23, 1958, Ser. No. 750,344
Claims priority, application Switzerland July 25, 1957
2 Claims. (Cl. 219—67)

The present invention relates to a method for the manufacture of hollow bodies from metallic band material and more particularly to a method for continuously producing a tubular member.

In the production of tubes from metallic band material the material is continuously transported and concurrently bent to a closed shape, and subsequently the meeting edges of the shape are welded together by electric resistance heating the welding current being applied to the so shaped band in transport direction in the vicinity of a location at which mechanical pressure is brought to bear upon the shape for the purpose of joining the edges.

For the production of tubes from band material in a continuous process, methods of the type mentioned are known, in which the welding is performed during the continuous transport of the material in the roller path between the shaping rollers and the calibrating rollers.

According to these conventional methods, hot-rolled, reeled steel bands are chiefly used as the initial material for making tubes. In continuous process, first the edges are trimmed and given a preliminary curvature. Subsequently, the band is formed into U-shape and thence into a circular slotted tube. This slotted tube then passes through the welding arrangement consisting usually of three pressure rollers and the roller-like welding electrode. The pressure rollers and the electrode rollers are arranged at the same location radially on the circumference of the tube. Electric current is applied via the electrode roller. The pressure of the electrode roller must be kept very high and constant to ensure a perfect transfer of the current, this being a condition precedent to a sound bonding of the edges. Especially with large tube diameters with thick walls, however, the pressure of the severely strained electrode roller is so high that the running surface of the electrode roller is soon crushed flat.

To remedy this, the running surface of the electrode roller must be re-shaped from time to time with a special turning device having its own drive means. These returning operations on the running surface, however, can be performed only when the production is interrupted. It is therefore very often necessary to put such plants out of operation. These frequent stoppages make this welding method uneconomical for large, thick-walled tubes.

It is therefore an object of the present invention to provide for a simplified yet highly efficient method of production of hollow or tubular members from strip or band material.

A further object of the present invention resides in the provision of a method facilitating the economical production of tubes of larger and smaller cross-sections from strip or band material.

Another object of the present invention is the provision of a method of welding the seam of tubes formed from band or strip material ensuring the production of tubes having welded seams of uniform high quality.

Still another object of the present invention is the provision of a tube having a cross-section permitting the welding of the seam when manufactured from strip or band material while exerting a minimum pressure on the welding electrodes.

A further object of the present invention is to provide a tube made from strip or band material having a cross-section comprising two semi-circular portions and two substantially flat portions intermediate the semi-circular portions and joining the latter in substantially tangential relation, the welding seam closing the profile being situated within one of the semi-circular portions.

These and other objects of the present invention will become better apparent from the following description when taken in connection with the accompanying drawings, in which.

Generally it will be seen that in accordance with the invention a method is provided in which a band is bent to a substantially oval shape with almost flat lateral surfaces, with the joining line running along a curved area of the shape, and that the electric current and the pressure are applied to the flat sides of the shape, the point of current supply being located at a distance from the joining line.

A device for carrying out this method has also been provided which includes transport means for a metallic band, means for bending this band axially to a closed oval shape, rollers for applying the current for heating the seam area, and pressure rollers arranged at a distance after the current supply rollers and designed to press the meeting edges against each other, in such a manner that the current supply rollers and the pressure rollers are in contact with the flat lateral surfaces of the shape.

The result achieved by the arrangement is that the electrodes themselves do not necessarily have to exert a pressure on the tubes. Also, even before the ultimate joining of the edges of the material, the tube is heated, thus facilitating processing. Another advantage consists in the improvement of welding performance, as the electric current density in the processing area is higher than in any known method of this type.

The invention is applicable to flat band material and, in addition, also to pre-shaped band material, such as extruded or drawn U-shaped bands.

Figure 1:
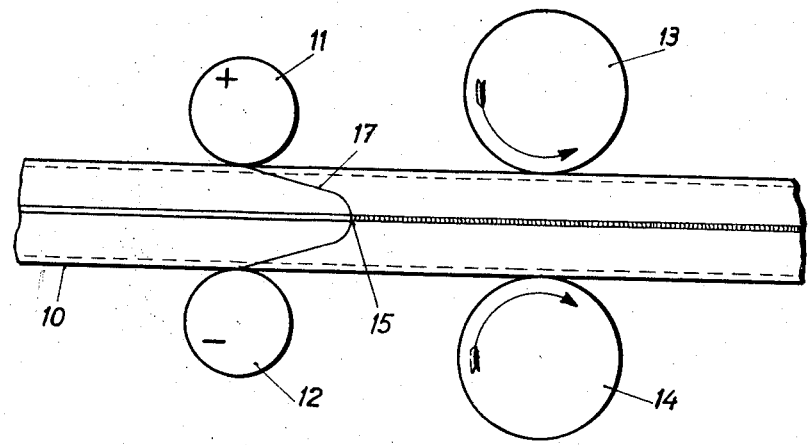
FIG. 1 is a schematic representation of an apparatus for producing tubular members from endless band or strip material in accordance with the present invention.

Referring now more specifically to the drawings, FIG. 1 shows diagrammatically a continuous method for the making of hollow bodies. The initial material, already processed to form a near-closed shape, passes through the electrode rollers 11 and 12 wihch are pressed against the tube 10 sufficiently only to ensure good electric contact free of resistance. Located after the electrode rollers with respect to the advancing direction of the material are the pressure rollers 13 and 14 which reduce the distance between the meeting edges of the shaped blank. The point 15, at which the welding bond is formed, is positioned between the electrode rollers 11, 12 and the pressure rollers 13, 14. In FIG. 1, the path of the current transferred by the electrodes is indicated by the line 17. Obviously, this current heats not only the actual welding point 15 but also the material positioned between the electrodes, so that the processing is made substantially easier for the pressure rollers. Again, it will be clearly seen from the drawing that the current density at the welding point 15 is especially high, as the individual current paths, or current lines, always tend to take the shortest way between the two terminals. As a result, the welding point 15 is heated intensely, thus ensuring a sound welding bond. If the blank stopped still, the welding point 15 would move up closer to the electrode rollers 11, 12. By a suitable choice of the advancing speed, however, the welding point 15 is maintained practically at the same place between the electrodes 11, 12 and the pressure rollers 13, 14.

Figure 2:
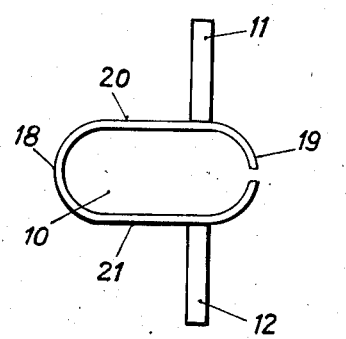
FIG. 2 is a cross-sectional view of a tube produced in accordance with the invention and showing the location of the electrode rollers with respect to the gap or seam to be welded.

As will be seen from FIG. 2, the blank between the electrode rollers is preferably so shaped that the part of the circumference between the electrode rollers 11 and 12 on the seam side is shorter than the part of the circumference around the opposite side. The shape shown in FIG. 2 is flat-oval and consists of two almost semi-circular lateral portions 18 and 19 and of the two flat intermediate portions 20 and 21. The gap is located in the lateral portion 19, for instance, as shown in the drawing. The flat portions offer a particularly good support to the electrode rollers 11 and 12, thus ensuring relatively firm and low-resistance contact.

Another good effect on the welding process is achieved by the interposition of a modulator (circuit breaker) in the power supply circuit. Like in flash butt welding, heat dispersion is prevented by the current pulses controlled by the modulator. This greatly reduces power consumption and considerably improves welding efficiency. The so welded flat-oval hollow shape can be given its final rounding in the calibrating rollers and straightening presses or in expanders. By changing the location of the welding point, it is possible to save a number of roller assemblies. Also, this method permits manufacturing particularly large tubes continuously in a single working stage, preferably from two flat sheet-iron strips slightly pre-bent at the edges only.

The foregoing description relates to the welding of hollow bodies shaped in the rolling process. The welding arrangement claimed under this invention, however, also permits of welding hollow bodies made by the extrusion process, since in extrusion, too, the first stage is the U-shape.

The non-circular, or oval, shape of the bent band presents the advantage of requiring lower pressure and that fewer oxide films form at the welding points, such oxide films being readily disintegrated in the welding process. As the pressure exerted by the electrode rollers is very low, these are less subject to wear, thus permitting to manufacture tubes having a relatively large diameter.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A method of producing a closed profile hollow member from endless band material, comprising the steps of continuously deforming said band material during transport thereof to a profile having at least two oppositely arranged substantially flat parallel sides, and two substantially semi-circular sides connected with each other by respective ones of said two flat sides, said flat sides constituting a major portion of said profile, one of said semi-circular sides being formed by respective longitudinal edge portions of said band material, said edge portions of said band material when forming said one semi-circular side closing a gap therebetween, applying an electrical welding current to said band material at oppositely situated first locations of said flat sides thereof adjacent said one semi-circular side, to thereby heat said respective edge portions by passage of said electrical current therethrough and over said closed gap, subsequently subjecting said one semi-circular side to pressure at a second location spaced from said first locations in the direction of transport of said band material when said respective edge portions are heated to rigidly join said edge portions with each other and form a seam at said closed gap, and transporting said band material with a speed from said first locations to said second location so as to direct said flow of electrical current over said closed gap at a third location intermediate said first and second locations respectively and longitudinally spaced therefrom to concentrate said flow of current at said closed gap, whereby said band material is completely closed at said one semi-circular side.

2. A method of producing a closed profile hollow member from endless band material, comprising the steps of continuously deforming said band material during transport thereof to a profile having at least two oppositely arranged substantially flat parallel sides constituting a major portion of side profile, forming a third side of said profile from respective arcuate longitudinal edge portions of said band, applying an electrical welding current in the form of pulses to said profile at oppositely situated locations of said flat sides thereof adjacent said third side so as to heat said respective edge portions by passage of said electrical current therethrough, and finally subjecting said third side to pressure at a position spaced from said oppositely situated locations in the direction of transport thereof after said respective edge portions have been heated to thereby rigidly join said edge portions with each other and form a seam so that said profile is completely closed at said third side at a location intermediate said oppositely situated locations and said position, respectively and longitudinally spaced therefrom.

References Cited in the file of this patent

UNITED STATES PATENTS

| | | |
|---|---|---|
| 1,534,133 | Murray | Apr. 21, 1925 |
| 1,866,256 | Heineman | July 5, 1932 |
| 2,647,981 | Wogerbauer | Aug. 4, 1953 |
| 2,774,857 | Rudd et al. | Dec. 18, 1956 |
| 2,794,108 | Park | May 28, 1957 |